Feb. 10, 1948.                L. APPLEBAUM                2,435,918
              HINGE FOR EYEPIECE AND TEMPLE FOR SPECTACLES
                           Filed July 9, 1946
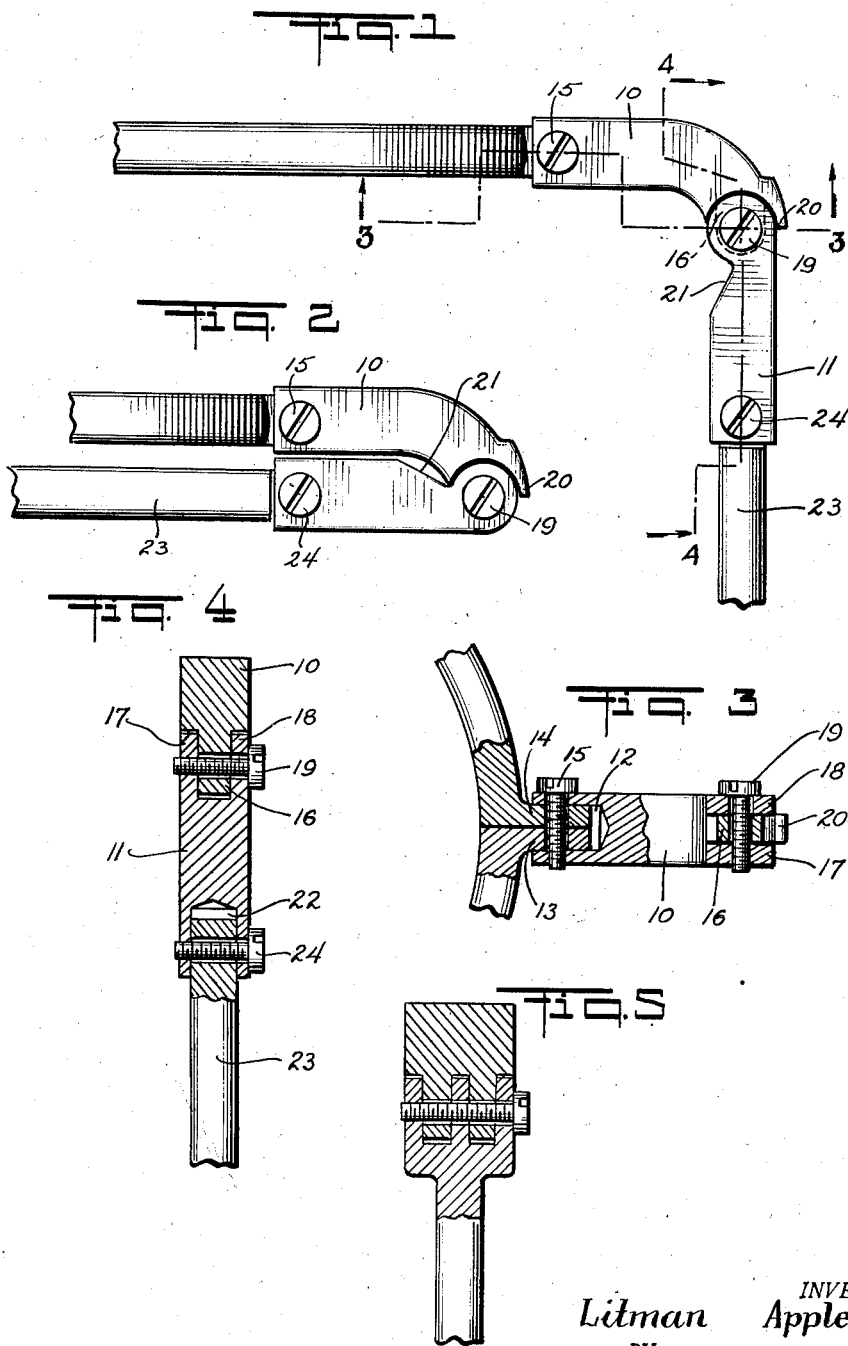
INVENTOR.
Litman Applebaum
BY
ATTORNEY Patented Feb. 10, 1948

2,435,918

UNITED STATES PATENT OFFICE 2,435,918

HINGE FOR EYEPIECE AND TEMPLE FOR SPECTACLES

Litman Applebaum, Brooklyn, N. Y.

Application July 9, 1946, Serial No. 682,274

2 Claims. (Cl. 88—53)

This invention relates to a hinge for a spectacle frame.

Broadly, it is an object of my invention to provide a simple hinge particularly adapted for plastic frames.

More particularly, it is an object of my invention to provide a hinge which can retain a split eyepiece to hold a lens in position within the eyepiece and also retain the temple piece.

A further object is to provide a hinge to connect the eyepiece and temple piece so that the temple piece can be folded inwardly parallel to the eyepiece and also to cause the temple piece to stop when at approximately a right angle to the eyepiece.

My hinge will avoid the necessity of applying heat to the plastic frame to expand it for receiving the lens. This method often causes distortion of the frame and mars the finish. By the use of a split eyepiece the lens can be more readily adjusted by loosening a screw and tightening it again after the adjustment. This operation will not cause any wear in the plastic material since the screw is threaded only into the metal hinge. Rivets are objectionable since adjustment is not easy and frames are caused to split.

I have overcome all of these objections by my improved hinge.

For a fuller understanding of the nature and objects of my invention reference is had to the following detailed description in connection with the accompanying drawings, in which:

Figure 1 is a top view of a hinge in open position.

Figure 2 is a top view of the hinge shown in Figure 1 in closed position.

Figure 3 is a section taken through line 3—3 of Figure 1.

Figure 4 is a section taken through line 4—4 of Figure 1.

Figure 5 is a modified hinge.

Referring to the drawings, my hinge is comprised of two parts; numeral 10 represents the frame hinge portion and numeral 11 the temple hinge portion. The frame hinge portion 10 has a square or other form of rectangular opening 12 at one end to receive the two opposed projections 13 and 14 at the end of the eyepiece. The top and bottom parts of the frame hinge portion 10 and projections 13 and 14 are provided with aligned holes, the bottom hole of the hinge portion being threaded to receive the threaded end of the screw 15 which locks the eyepiece projections 13 and 14 together, as shown in Figure 3. Of course, the head of screw 15 may be countersunk so that it is flush with the top of the hinge portion.

The opposite part of the frame hinge portion 10 has a central tongue 16 projecting within a semi-circular end to receive the opposed tongues 17 and 18 of the temple hinge portion 11. Aligned openings are provided in tongues 16, 17 and 18 to receive screw 19 providing a hinge. The opening in tongue 17 is threaded to receive the screw 19 the head of which may be countersunk, if desired.

A stop 20 is provided at the end of hinge portion 10 which prevents the temple hinge portion 11 from pivoting more than 90° from the frame hinge portion 10.

Temple hinge portion 11 has an indent or notch 21 which permits it to be swung parallel to the eyepiece as shown in Figure 2. Hinge portion 11 also has a square or other rectangular opening 22 at its opposite end adapted to receive the end of a temple piece 23. Aligned openings are provided adjacent the said end of portion 11 at the top and bottom and an opening aligned therewith is provided in the end of the temple piece 23 to permit screw 24 to pass therethrough, the bottom opening being threaded to receive the threaded end of screw 24, the head of which may be countersunk, if desired.

In Figure 5 I have shown a double and triple hinge instead of the single and double hinge hereinbefore described.

It is obvious that various changes and modifications may be made in the details of construction, such as substituting another type of opening for the square or other rectangular openings 12 and 22, without departing from the general spirit of the invention.

I claim:

1. A spectacle frame hinge for a split plastic eyeglass frame having projections at the split portion comprising an extending frame hinge portion arcuately shaped at its end and a straight extending temple hinge portion, square openings at the ends of said hinge portions for receiving said eyeglass projections and the end of a temple piece within said openings, means for locking said eyepiece and temple piece within said openings a stop at the end of said frame hinge portion to prevent said temple hinge portion from opening more than 90°, a notch at the inside of said temple hinge portion to permit said temple hinge portion to swing parallel and close to said frame hinge portion.

2. In combination with a split plastic eyeglass frame having projections adjacent the split portions with a hinge comprising an extending frame portion arcuately shaped at its end and a straight extending temple portion, said hinge portions having square openings at the ends thereof adapted to receive said projections and the end of a temple piece completely encasing same, screw means for releasably securing said projections and said temple piece, a stop on one of said hinge portions to prevent said hinge from opening more than 90°, a cut out on the other of said hinge portions to permit said hinge to close parallel and close to said first hinge portion.

LITMAN APPLEBAUM.

REFERENCES CITED

The following references are of record in the file of this patent:

UNITED STATES PATENTS

| Number | Name | Date |
| --- | --- | --- |
| 1,342,973 | Shreiner | June 8, 1920 |